INVENTORS
JOHN B. FERRY
ANGELO F. ORAZIO

SPACE PATTERN
OF HORNS

TRANSMISSION

RECEPTION

United States Patent Office 3,263,227
Patented July 26, 1966

3,263,227
PULSE COMPRESSION RADAR TRACKING
SYSTEM
John B. Ferry, Commack, and Angelo F. Orazio, New
Hyde Park, N.Y., assignors, by mesne assignments, to
the United States of America as represented by the Secretary of the Navy
Filed June 10, 1964, Ser. No. 374,210
4 Claims. (Cl. 343—17.2)

This invention relates in general to a radar tracking system and in particular to a pulse radar tracking system employing intra-pulse frequency diversity.

It frequently occurs in the design of a radar system that two or more of the desired design characteristics will be in conflict with one another. Such is the case in the design of a pulse radar system wherein it is desirable to use pulses of relatively short duration for obtaining improved range resolution and it is also desirable to use pulses of a relatively longer duration so as to permit the transmission of low peak and high average power. Prior art solutions to this problem involve either a compromise between these two characteristics or the use of some apparatus whereby the received pulse can be compressed in time duration.

Apparatus has been devised which will cause the compression or narrowing of a received target return signal as compared to the transmitted width of that signal. Such prior art attempts at pulse compression have not provide entirely successful in that a number of undesirable side effects have also been introduced along with the pulse compression. Some of these side effects are, for example, poor signal discrimination, pulse-to-pulse flutter, and problems of phasing and frequency stability.

The general purpose of this invention is to provide a pulse radar which embraces the advantages of similarly employed devices and possesses none of the above described disadvantages. To achieve this, the present invention contemplates a radar system wherein the transmitted pulse is made up of a number of pulse segments each of equal duration but of different frequency transmitted sequentially. The return pulses as received will be delayed to permit the pulse segments to be added into a single composite pulse. This composite pulse will then be utilized in the radar system.

Accordingly, it is an object of this invention to provide a pulse radar system having a novel means for, and a method of, compression of received pulses.

Another object is to provide a pulse radar system that achieves pulse compression of return signals without the need for pulse compression filters.

A further object of the invention is the provision of a pulse radar system in which the transmitted pulse is composed of a number of pulse segments of different frequencies.

Still another object of this invention is to provide a pulse radar system in which the transmitted pulse is composed of a number of discrete pulse segments of different frequency which are equal in duration and consecutive in time.

Still another object is to provide a monopulse radar system in which the transmitted pulse is composed of a number of pulse segments of different frequency and consecutive duration and where the received return pulse signals are added to form a composite pulse whose width is that of the duration of one of the transmitted pulse signals.

Yet another object of the present invention is the provision of a monopulse radar system wherein the transmitted pulse is composed of a number of discrete pulse segments of different frequency which are equal in duration and consecutive in time and wherein the received return pulse segments are delayed so that the pulse segments can be added to form a whole pulse whose width is that of the duration of one of the transmitted pulse segments.

Other objects and advantages of the invention will hereinafter become more fully apparent from the following description of the annexed drawings which illustrate a preferred embodiment and wherein.

Figure 1:
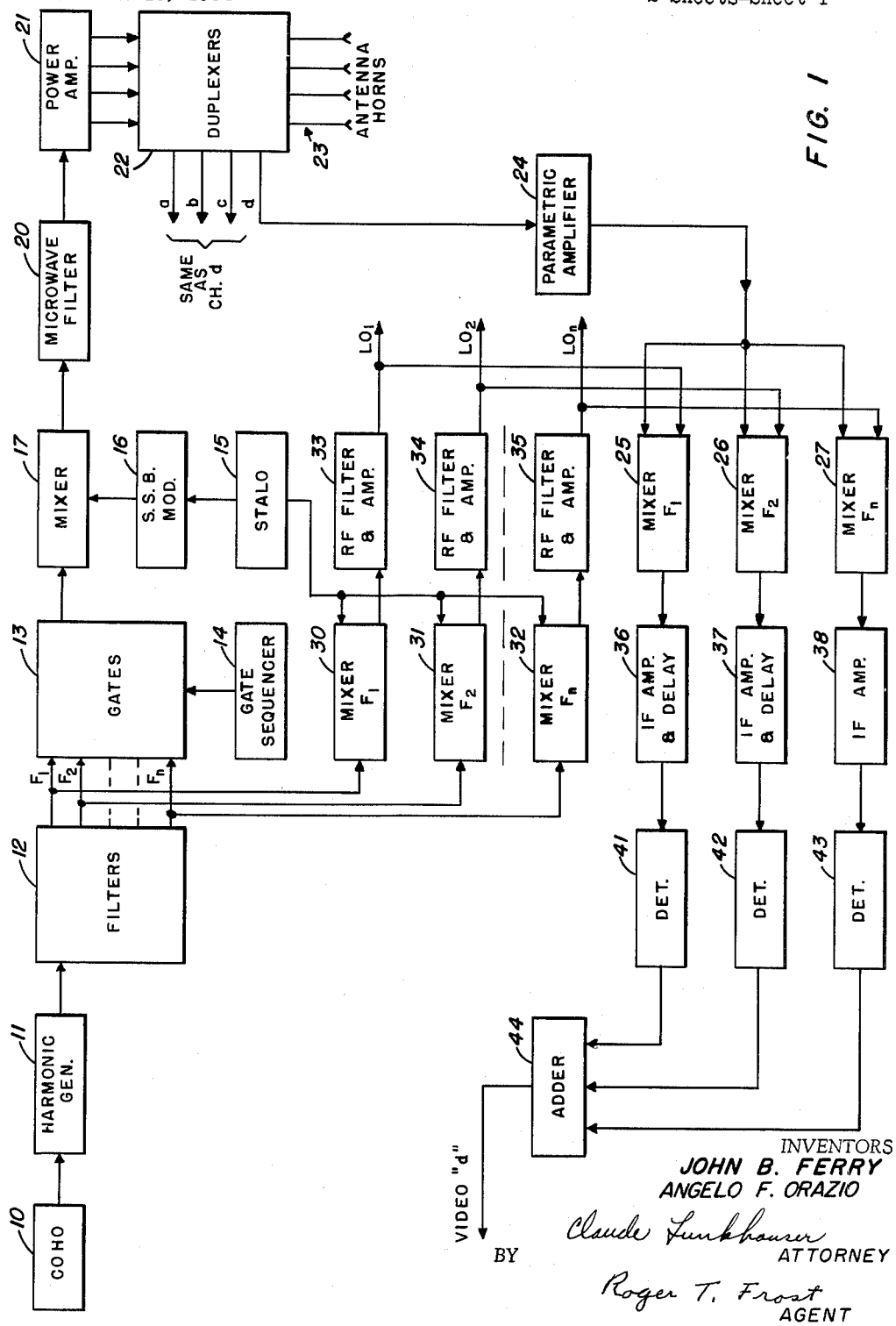
FIG. 1 shows a block diagram of a monopulse radar transmitter and receiver system according to the present invention.

Turning now to the radar system as shown in FIG. 1, there is shown a coherent oscillator (COHO) 10 the output of which is supplied to mixer and harmonic generator 11. Harmonic generator 11 produces an output which not only includes the fundamental frequency provided by the coherent oscillator but which is also rich in harmonics of that fundamental frequency. The output of the harmonic generator is supplied to filter section 12, which contains a number of filters the input of each of which is connected to the input of the filter section. These filters are respectively tuned to permit passage of frequencies $F_1$, $F_2$, $F_3$ ... to $F_n$ where frequency $F_1$ is the fundamental output frequency of the coherent oscillator 10, $F_2$ is the second harmonic of this fundamental frequency, $F_3$ is the third harmonic, and $F_n$ is the nth harmonic of the fundamental frequency.

The output of each of the filters of filter section 12 are individually passed to the input of gate section 13. Gate section 13 contains $n$ gates which are normally in an "off" or non-conductive state but which are sequentially gated "on" by gate sequencer 14. The gate section thus permits consecutive passage of frequencies $F_1$, $F_2$, $F_3$ ... $F_n$ to the mixer 17.

Mixer 17 is supplied with outputs both from the gate section 13 and from a stable local oscillator (STALO) 15. The output of stable local oscillator 15 is passed through S.S.B. modulator 16 to the mixer 17. The output of mixer 17 passes through microwave filter 20, which serves to remove all frequencies in the non-microwave range, and then passes on to the power amplifier 21. Signals amplified in power amplifier 21 during transmit operation of the radar system are passed through duplexers 22 and are transmitted though antenna feed horns shown generally at 23.

Figure 2:
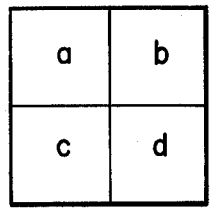
FIG. 2 shows a schematic representation of the horns of a monopulse radar antenna.

As is known in the art, the antenna of a monopulse radar system generally consists of four feed horns or other RF sources which are symmetrically disposed around the focal point of a parabolic reflector. The spatial arrangement of these feed horns is very generally shown in FIG. 2 wherein the four horns A, B, C and D represent the antenna feed horns generally shown as element 23 in FIG. 1.

When the radar system is in the receive mode signals received by each of feed horns A, B, C and D are passed through the duplexers into ouptus designated in FIG. 1 as A, B, C and D. Inasmuch as the receiver channel for each of these outputs is the same, for convenience only the receiver channel for output D will be shown, it being understood that outputs A, B and C have similar receiver channels attached thereto.

The return signal from feed horn D is amplified in parametric amplifier 24 and then is passed on to a series of receiver mixer 25, 26 and 27. Although only three of such receiver mixers are shown in FIG. 1, it should also be understood that there is a receiver mixer for each of frequencies $F_1, F_2 \ldots F_n$; thus, there will be $n$ receiver mixer units in each channel. Each of the receiver mixer units 25, 26 and 27 also receive as an input a local oscillator signal derived from the filter section 12. Each of the $n$ outputs of the filter section 12 is fed to a corresponding local oscillator mixer. Each of these local oscillator mixers 30, 31 and 32 also receives as an input the output of stable local oscillator 15. The output of each of the local oscillator mixers is passed to an RF filter and amplifier unit 33, 34 and 35, each of which functions to remove unwanted frequency components and to amplify the remaining local oscillator signal. Since there is a local oscillator mixer and its corresponding filter and amplifier for each of frequencies $F_1$ to $F_n$, it follows that there will be $n$ mixers and $n$ corresponding RF filter and amplifier units.

It will be seen that the local oscillator output signal derived from local oscillator mixer 30 is fed as an input into receiver mixer 25. In a similar way the output from the local oscillator mixer 31 is fed to receiver mixer 26. In this way, each of the $n$ receiver mixers will receive a local oscillator signal from the corresponding local oscillator mixer. These local oscillator signals which may be designated $LO_1, LO_2 \ldots LO_n$ are also fed to the corresponding receiver mixers in the receiver channels for outputs A, B and C.

The output from receiver mixer 25 is passed on to IF amplifier and delay unit 36. Similarly, the output from receiver mixer 26 is passed to its corresponding IF amplifier and delay unit 37. All of the receiver mixers with the exception of the $F_n$ mixer 27 is in a similar manner passed on to a corresponding IF amplifier and delay unit. The output from the $F_n$ mixer 27, however, is passed on to an IF amplifier unit at 38 having no delay, as will be set forth in more detail later. The delay times of the delay units 36 and 37 are unequal.

The outputs from the several IF amplifier and delay units 36 and 37 and from IF amplifier 40 each pass to a corresponding detector means 41, 42 and 43, it being understood that there are $n$ such detector means. The outputs from the $n$ detector means are then passed to a single adder 44. This adder operates to form a summation of the several signals received from the detector units and to provide a composite video output pulse for channel D.

It should be realized at this point that similar signal channels are present for outputs A, B and C. Thus, for each of these outputs A, B and C there would be a group of mixers like 25, 26 and 27; amplifiers and delays like 36 and 37; an IF amplifier like 38; detector like 41, 42 and 43; and an adder like 44. Thus, the resultant output for the entire system will be four composite signals, one obtained from each of the receiver channels.

Figure 3:
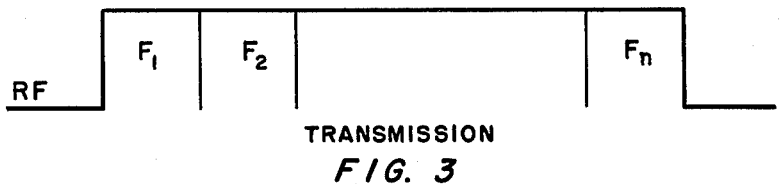
FIG. 3 shows a composite pulse as transmitted by the present invention.
Figure 4:
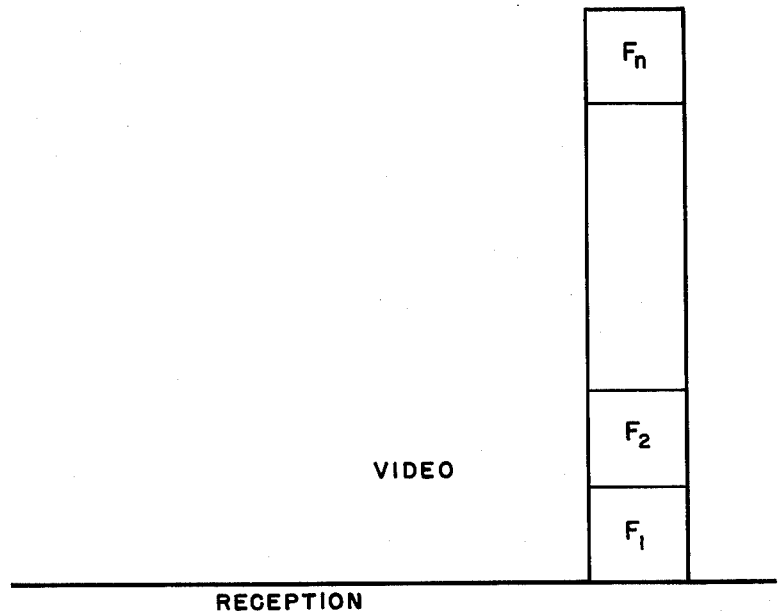
FIG. 4 shows a composite video pulse made up of pulse return segments according to the present invention.

The operation of the invention will now be described. It should be kept in mind that a radar transmitted pulse can be broken up into $n$ number of discrete frequencies which are each equal in duration and consecutive in time. Such a composite pulse is shown diagrammatically in FIG. 3 wherein it can be seen that the transmitted pulse is actually composed of frequency components or pulse segments $F_1, F_2 \ldots F_n$ generated and sequentially transmitted by the radar system. As an example, if $n$ is taken as 10 and $F_1$ as 35 mc. an upper frequency $F_n$ of 350 mc. can be realized. If the duration of each individual pulse segment is 2 microseconds the total pulse width will thus be 20 microseconds. The target return signal as seen by the system antenna will also consist of a consecutive series of pulse segments of different frequency. In the example chosen, in each receiver channel the frequency pulse segment $F_1$ will be delayed 18 microseconds, $F_2$ will be delayed 16 microseconds, $F_3$ will be delayed 14 microseconds, and $F_n$ will not be delayed at all. As a result of these delays all of the targets return pulse segments will be detected at the same time by the detectors 41, 42 and 43, and the outputs of the detectors will arrive at adder 44 at the same time. The output of adder 44, as shown diagrammatically in FIG. 4, will be a pulse of width $1/n$ times the width of the transmitted pulse (in the example chosen 2 microseconds) and will be a summation of all of the returns $F_1$ through $F_n$.

The basic pulse segment $F_1$ will be generated in coherent oscillator 10 and this basic pulse and the harmonics thereof created in harmonic generator 11 are delivered to filter section 12. This filter section 12 separates the $n$ pulse segments that will make up the composite transmitted pulse and passes on these pulse segments to gate section 13. During the time of transmission of the composite pulse by the radar system, gate sequencer 14 will cause gate section 13 to sequentially pass pulse segments $F_1$ through $F_n$ each for an equal period of time. These pulses segments thus passed, which in the example previously chosen would range in frequency from 35 megacycles to 350 megacycles, are then mixed with the output of stable local oscillator 15. This stable local oscillator may be operating in the C band and S.S.B. modulator 16 may, for example, be operating at a frequency of 30 mc. The microwave components of the mixed signal will be passed through filter 20, amplified in amplifier 21 and then transmitted via feed horns 23.

The outputs of filter section 12, which are not gated and which are continuously present, are respectively passed on to the $n$ local oscillator mixers 30, 31 and 32. An output from the stable local oscillator 15, which also operates at all times, is also supplied to each of the $n$ local oscillator mixer units. The output of each of the $n$ mixers passes to its respective filter and amplifier unit wherein unwanted frequencies are removed and the remaining local oscillator frequency is amplified and supplied to the appropriate receiver mixer in the four receiver channels A, B, C and D. There each of the incoming return pulse segments is mixed with the appropriate local oscillator signal and the resulting intermediate frequency is passed on to the intermediate frequency amplifier and delay units 36 and 37, the output of the $n$th mixer being passed on to intermediate frequency amplifier 40. The various pulse segments, excepting the $n$th segment, are delayed as mentioned above and then all are detected in the several detector units. The sum of the outputs of these detectors forms the composite video signal corresponding to the D channel of the monopulse radar system. As mentioned earlier, similar reception treatment is given to the A, B and C return signals.

Once video signals corresponding to the four monopulse channels have been derived, these signals may be added and subtracted in a manner well known in the art to provide azimuth and elevation information. Of course, it will be understood that the technique disclosed in this invention for the compression of radar pulses need not be limited to a monopulse radar system but may be employed in any pulse radar system.

Stability of operation of the disclosed radar system is enhanced by the fact that the stable local oscillator 15 operates at all times during the operation of the radar system. No gating of signals at or near the transmitting frequency is required since the only transmitted signals that are gated are the output of the coherent oscillator and the harmonics thereof. Since the frequency of the coherent oscillator 10 and the stable local oscillator 15 are used to determine the local oscillator frequencies supplied to the receiver section any drift in frequency of either of these two oscillators will not adversely affect the frequency operation of the receiver.

Various modifications are contemplated and may obviously be resorted to by those skilled in the art without departing from the spirit and scope of the invention as hereinafter defined by the appended claims as only a preferred embodiment thereof has been disclosed.

What is claimed is:

1. A pulse radar system for providing pulse compression comprising:
    an oscillator producing an output at a fundamental frequency;
    harmonic generating means receiving the oscillator output, the harmonic generating means having an output containing the fundamental frequency and at least one harmonic frequency of the fundamental frequency;
    filter means receiving the output of the harmonic generating means, said filter means functioning to separate the fundamental frequency and each of the harmonic frequencies from one another and to deliver each of these frequencies to a separate output;
    gate means receiving each of the outputs of the filter means, said gate means having a single output and operating to connect consecutively and for an equal duration of time each of the filter means outputs, in sequence from the fundamental frequency to the highest order harmonic frequency, to the gate means output, whereby the sequence of output frequencies forms a composite pulse at a desired frequency, each of the component frequencies being a pulse segment of this composite pulse, none of these component frequencies being in the microwave region;
    a second oscillator producing an output signal at a desired microwave frequency;
    mixer means receiving the composite pulse output of the gate means and the microwave output signal from said second oscillator and combining these inputs;
    microwave filter means receiving the output of the mixer means and permitting passage only of those frequencies in the microwave region;
    power amplifier means accepting the output of the microwave filter means and amplifying this output to a level suitable for radar transmission;
    radar receiver means for receiving a target return pulse which is a reflection of the transmitted pulse from an object to be detected, said receiver means including:
        a plurality of channels equal in number to the number of outputs of said filter means, whereby there is provided a receiver having a channel for each of the pulse segments that comprises the composite pulse, the target return signal being supplied to the input of each channel;
        local oscillator source;
        receiver mixer means in each of the channels, each of the receiver mixer means receiving the target return signal and a signal from a local oscillator source, the frequencies of each of the local oscillator signals being chosen to produce a predetermined intermediate frequency output signal when mixed with the pulse segment associated with a particular channel;
        intermediate frequency amplifier means in each of the channels, the intermediate frequency output of the receiver mixer means in each channel being supplied to and amplified by the intermediate frequency amplifier means in that channel;
        delay means in each of the channels except for that channel corresponding to the last-transmitted pulse segment in the composite pulse, the delay periods introduced in these channels by the delay means differing from one another and being chosen so that the pulse segments of the target return pulses exit their respective delay means simultaneously and coincident with said last-transmitted pulse segment;
        detector means in each channel receiving the respective pulse segments at a time of coincident occurrence, each detector means delivering at its output a video pulse segment; and
        adding means receiving the output of all of the detector means and delivering an output which is a summation of the coincident video pulse segments received whereby the output of the adding means constitutes a video pulse of reduced width relative to the composite pulse.

2. A system as in claim 1 wherein said local oscillator source includes a number of channels corresponding to the receiver channels, each of the local oscillator channels having a local oscillator mixer receiving a first input from the output of the filter means which contains the frequency from which is derived the pulse segment intended for that particular receiver channel and a second input from said second oscillator, whereby the output of each local oscillator mixer includes the local oscillator signal for the associated receiver channel, and the local oscillator filter means in each local oscillator channel receiving the local oscillator mixer output and permitting passage only of the local oscillator signal in that channel, the output of said filter means being supplied to the respective receiver mixer means.

3. A radar pulse receiver used to receive a transmitted signal that consists of a composite pulse made up of a plurality of consecutive pulse segments of equal duration and unequal frequency, said receiver comprising:
    a plurality of channels equal in number to the number of pulse segments contained in the transmitted composite pulse, whereby there is provided a receiver having a channel for each of the pulse segments that comprise the composite pulse, the received input signal to the receiver being supplied to each channel;
    local oscillator means;
    mixer means in each of the channels, each of the mixer means receiving the received input signal and a signal from said local oscillator means, the frequencies of each of the local oscillator signals being chosen to produce a predetermined intermediate output signal when mixed with the pulse segment associated with a particular channel;
    intermediate frequency amplifier means in each of the channels, the intermediate frequency output of the mixer means in each channel being supplied to and amplified by the intermediate frequency amplifier means in that channel;
    delay means in each of the channels except for that channel corresponding to the last-transmitted pulse segment in the composite pulse, the delay of periods introduced in the channel by the delay means differing from one another and being chosen so that the pulse segments of the received input signal exit their respective delay means simultaneously with said last transmitted pulse segment;
    detector means in each channel receiving the respective pulse segments at a time of coincident occurrence, each detector means delivering at its output a video pulse segment; and
    adding means receiving the outputs of all of the detector means and delivering an output which is a summation of the coincident video pulse segments received, whereby the output of the adding means constitutes a video pulse of reduced width relative to the composite pulse.

4. An apparatus of claim 3 wherein said local oscillator means includes a number of channels corresponding to the plurality of receiver channels, each of the local oscillator channels having a stable oscillator, a mixer, and filter means, each of said mixers receiving a first input frequency signal from which the pulse segment for that particular receiver channel has been derived, and a second input signal from said stable oscillator whereby the output of each mixer in each local oscillator channel includes a local oscillator signal for the associated receiver channel, and said filter means in each local oscillator channel receives the output from said local oscillator mixer and permits the passage only of the local oscillator signal for that channel, the output of said filter means of each of said local oscillator channels being supplied to the respective receiver mixer means in said receiver channels.

References Cited by the Examiner

UNITED STATES PATENTS

| | | |
|---|---|---|
| 2,624,876 | 1/1953 | Dicke. |
| 3,156,914 | 11/1964 | Welti _____ 343—17.2 X |
| 3,165,741 | 1/1965 | Thor. |
| 3,202,989 | 8/1965 | Kagawa. |

CHESTER L. JUSTUS, *Primary Examiner.*

R. D. BENNETT, *Assistant Examiner.*